Dec. 10, 1963   R. C. PIPER   3,113,356
SOLAR SCREEN CONSTRUCTION
Filed March 3, 1961
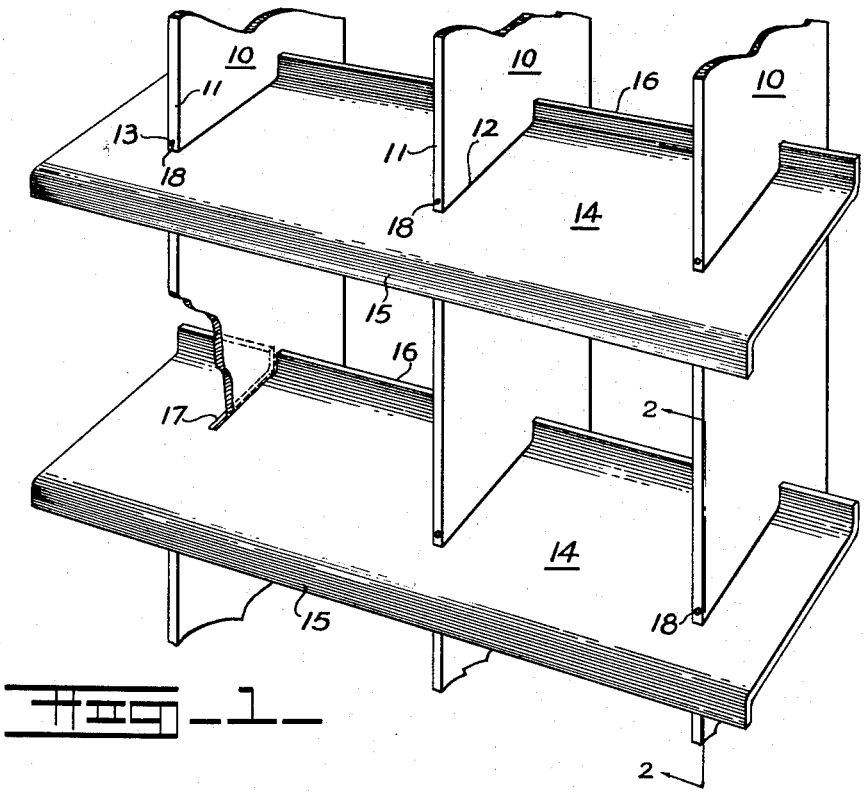
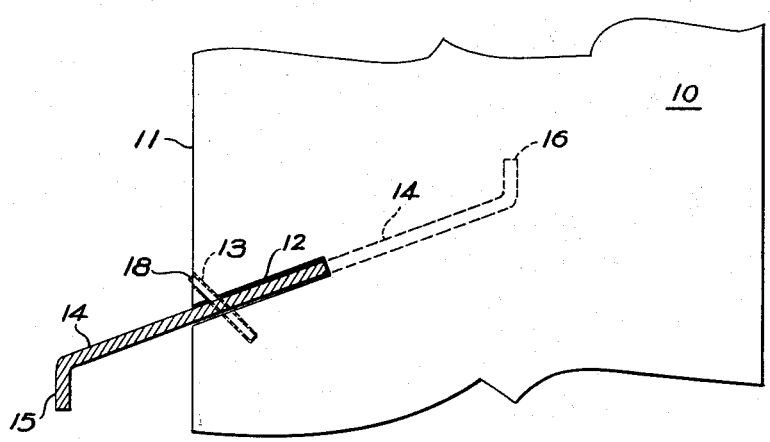
INVENTOR.
Raymond C. Piper
BY
W. B. Kaufman
ATTORNEY.

United States Patent Office 3,113,356
Patented Dec. 10, 1963

3,113,356
SOLAR SCREEN CONSTRUCTION
Raymond C. Piper, Youngstown, Ohio, assignor to Youngstown Ornamental, Inc., Youngstown, Ohio, a corporation of Ohio
Filed Mar. 3, 1961, Ser. No. 93,085
1 Claim. (Cl. 20—63)

This invention relates to a solar screen construction adapted to be used in front of the walls and windows of a building to shade the same from the sun while permitting light and air to pass therethrough.

The principal object of the invention is the provision of a solar screen construction in which horizontal louvers are secured to vertical support members by novel means.

A further object of the invention is the provision of a solar screen construction that may be rapidly and inexpensively made and which forms a light-weight highly ornamental construction when applied to the exterior of a building.

A still further object of the invention is the provision of a solar screen construction including a plurality of vertically spaced inclined louvers and a plurality of horizontally spaced vertically positioned support members, both of which are slotted for co-operative engagement with one another whereby the louvers appear to extend continuously through the vertical support members and the vertical support members appear to extend continuously through the horizontal louvers.

A still further object of the invention is the provision of a solar screen including vertical support members and louvers positioned crosswise thereof and means extending through said support members and louvers for holding the same in assembled relation.

The solar screen disclosed herein comprises an improvement in the art relating to such devices which are intended to be positioned in spaced relation to the exterior walls of a building to form the visible outer surfaces thereof and to provide an attractive unbroken surface or wall which will shade the actual building wall and windows, while permitting light and air to pass freely therethrough. Such solar screens are particularly useful with buildings having their outer walls formed largely of glass. In such buildings the sun load results in abnormal heating of the rooms in the building in the summer time and requires very greatly increased capacities in the air conditioning equipment used in the buildings. It has, therefore, been proposed to position a solar screen about the building to absorb the radiant energy of the sun and it has been found that such solar screens can be highly decorative as well as useful.

The solar screens heretofore known in the art have generaly comprised masonry constructions sometimes formed of apertured concrete blocks or hollow building tiles and these constructions have been relatively expensive and added considerable weight to the building structure. The present invention relates to a solar screen which may be formed of rolled or extruded aluminum or other light-weight metal sections and which solar screen may be formed of continuous lengths of material extending vertically and across a wall of the building or it may alternately be formed in assembled panels either of which constructions are supported by the building walls on outrigger arms and/or brackets and are sufficiently spaced from the building walls and windows to permit circulation of air therebehind.

The present invention discloses an arrangement of vertical supports and horizontal louvers which are secured to one another by novel means and which provide a structurally strong yet practical and light-weight solar screen which may be applied to new and existing buildings.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure which do not constitute departures from the spirit and scope of the invention.

The invention is illustrated in the accompanying drawing, wherein:

FIGURE 1 is a perspective view of a small portion of the solar screen with parts broken away.

FIGURE 2 is a vertical section on an enlarged scale taken on line 2—2 of FIGURE 1.

By referring to the drawings and FIGURE 1 in particular, it will be seen that the solar screen comprises a plurality of vertical support members 10, 10 which are relatively thin flat sections of metal or other suitable material positioned vertically and supported by suitable means (not shown). The vertical support members 10, 10 are slotted inwardly from their front edges 11, 11 as indicated at 12, 12 a distance approximately ¼ of their depth as best seen in FIGURE 2 of the drawings. The slots 12 are inclined with their innermost ends elevated with respect to their ends extending through the front edges 11 of the vertical support members 10, 10. Slots 12 are arranged in horizontally extending and vertically spaced rows as shown in FIG. 1. Inclined openings 13, 13 are formed inwardly and downwardly in each of the vertical support members 10, 10 and extended from the front edges 11, 11 thereof downwardly across the inclined slots 12, 12 therein. A plurality of angularly disposed horizontally extending louvers 14, 14 flanged at their opposite longitudinal edges as at 15 and 16 and provided with slots 17, 17 extending inwardly from their rearmost flanged edges 16 are positioned in engagement with the slots 12, 12 in the vertical support members 10, 10 so that a substantial portion of each of the louvers 14, 14 is positioned between each of the vertical support members 10, 10 and with a part of each of the louvers 14, 14 extending forwardly of the front edges 11, 11 of the vertical support members 10, 10 and terminating in the downward flanges 15, 15 which are therefore positioned in spaced relation to the forward edges 11, 11 of the vertical support members 10, 10. In order that the louvers 14, 14 may be held in engaged position in the angular slots 11, 11 in the vertical support members 10, 10 pins 18, 18 are positioned in the openings 13, 13 in the edges 11, 11 of the vertical support members 10, 10 and the pins 18, 18 extend inwardly and downwardly through openings in the louvers 14, 14 thereby securing the louvers 14, 14 in fixed relation to the vertical support members 10, 10.

It will thus be seen that there is a multiple engagement of the support members 10, 10 and louvers 14, 14, first, the engagement of the slotted louvers 14, 14 with the non-slotted portions of the support members 10, 10 and second, there is the engagement of the slotted portions of the support members 10, 10 with the non-slotted portions of the louvers 14, 14 and finally there are the pins 18 which engage both the vertical support members 10, 10 and the horizontally disposed louvers 14, 14.

The structure produced is quite rigid due to the angular positioning of the louvers 14, 14 with respect to the vertical positioning of the support members 10, 10 and the fact that the louvers 14, 14 are provided with the longitudinally extending flanges 16, 16 through which the slots 17, 17 are formed so that perpendicular walls formed by the ends of the slotted flanges 16, 16 abut the opposite sides of each of the vertically positioned support members 10, 10.

The solar screen construction differs from the "egg crate" paperboard carton which it somewhat resembles in that the solar screen construction disclosed herein cannot be collapsed sidewardly as can a paperboard "egg crate" carton structure.

It will thus be seen that a simple and efficient solar screen construction has been disclosed which may be inexpensively formed and which produces a structurally strong light-weight attractive appearing solar screen that may be advantageously mounted on buildings to provide sun screens therefor as well as a decorative exterior wall therefor and having thus described my invention, what I claim is:

A vertically extending solar screen for covering the vertical face of a building so as to shade said face from the sun and yet permit free circulation of air to and from said building, said solar screen comprising a plurality of flat horizontally spaced elongated support members each having a vertically extending longitudinal axis, said support members having front and rear edges lying in front and rear parallel vertical planes, said rear edges adapted to be positioned adjacent said building face, said members being provided with horizontally extending and vertically spaced rows of slots, each slot extending upwardly and rearwardly from said front edges a distance substantially less than half the distance between said front and rear edges, a plurality of thin horizontally extending louvres vertically spaced from one another and connected to said support members, said louvres having front and rear edges lying in front and rear planes respectively, said louvres having vertical rows of elongated recesses extending from the rear edges thereof to a central portion thereof, each of said louvres located within one of said horizontal rows of slots and each of said support members located within one of said vertical rows of recesses, said rear edges of said louvres lying generally mid-way between the front and rear edges of said support members and the front edges of said louvres being spaced a substantial distance forwardly of the front edges of said support members, the front edge of each louvre including an integral, continuous front flange extending vertically downwardly therefrom and spaced forwardly of the front edges of the support members, and the rear edge of each louvre including rear flanges extending vertically upwardly therefrom, said recesses extending through said rear flanges whereby the ends of said rear flanges define opposing walls which abut opposing side surfaces of each of said support members so as to prevent relative tilting of said support members and louvres, a plurality of securing pins extending diagonally downwardly from the front edge of each support member, one of said pins extending through each slot and one of said louvres so as to securely lock said louvres and said support members.

References Cited in the file of this patent

UNITED STATES PATENTS

| | | |
|---|---|---|
| 1,768,157 | Shelden | June 24, 1930 |
| 2,075,135 | Reynolds | Mar. 30, 1937 |
| 2,384,847 | Perry | Sept. 18, 1945 |
| 2,822,069 | Morphew | Feb. 4, 1958 |

FOREIGN PATENTS

| | | |
|---|---|---|
| 1,249,621 | France | Nov. 21, 1960 |